United States Patent
Okumura et al.

(10) Patent No.: US 8,535,774 B2
(45) Date of Patent: Sep. 17, 2013

(54) RELEASE SHEET

(75) Inventors: Nobuyasu Okumura, Kyoto (JP);
Masafumi Yamada, Kyoto (JP); Kenjin Shiba, Kyoto (JP)

(73) Assignee: Unitika Ltd., Hyogo (JP)

(*) Notice: Subject to any disclaimer, the term of this patent is extended or adjusted under 35 U.S.C. 154(b) by 262 days.

(21) Appl. No.: 12/674,235

(22) PCT Filed: Mar. 13, 2008

(86) PCT No.: PCT/JP2008/000557
§ 371 (c)(1),
(2), (4) Date: Feb. 19, 2010

(87) PCT Pub. No.: WO2009/025063
PCT Pub. Date: Feb. 26, 2009

(65) Prior Publication Data
US 2011/0151167 A1    Jun. 23, 2011

(30) Foreign Application Priority Data
Aug. 22, 2007  (JP) .................... 2007-216044

(51) Int. Cl.
*B32B 9/00*    (2006.01)
*B32B 33/00*    (2006.01)

(52) U.S. Cl.
USPC ....................... 428/40.1; 428/41.3

(58) Field of Classification Search
USPC ........................................... 428/40.1
See application file for complete search history.

(56) References Cited

U.S. PATENT DOCUMENTS
2007/0196677 A1*  8/2007  Okumura ............... 428/480

FOREIGN PATENT DOCUMENTS

| | | | |
|---|---|---|---|
| JP | 2001-105547 | | 4/2001 |
| JP | 2005-146080 | | 6/2005 |
| JP | 2005146080 A | * | 6/2005 |
| JP | 2007-126586 | | 5/2007 |
| JP | 2007126586 | * | 5/2007 |
| TW | 200604231 A | | 2/2006 |

OTHER PUBLICATIONS

Translation of JP 2005-146080, Jun. 2005.*
Translation of JP 2007-126586, May 2007.*
English translation of relevant parts of TW200604231A.

* cited by examiner

*Primary Examiner* — Hui Chin
(74) *Attorney, Agent, or Firm* — Fildes & Outland, P.C.

(57) ABSTRACT

Disclosed is a release sheet including a substrate and a resin layer formed on the substrate. The resin layer includes: 100 parts by mass of an acid-modified polyolefin resin including an acid-modifying component in a content of 1 to 10% by mass; and 1 to 50 parts by mass of a crosslinking agent and/or 5 to 1000 parts by mass of polyvinyl alcohol. The crosslinking agent is composed of a carbodiimide compound and/or an oxazoline compound.

24 Claims, No Drawings

RELEASE SHEET

TECHNICAL FIELD

The present invention relates to a release sheet.

BACKGROUND ART

Release sheets are widely used industrially. Examples of known release sheets include: materials for protecting or processing the pressure-sensitive adhesive/adhesive surfaces of pressure-sensitive adhesive materials such as pressure-sensitive adhesive sheets and pressure-sensitive adhesive tapes; processing materials for producing wiring boards such as printed wiring boards, flexible printed wiring boards and multilayer printed wiring boards; materials for protecting liquid crystal display components such as polarizing plates and retardation plates; and materials used for the purpose of forming sheet-shaped structures. Hereinafter, the objects to which release sheets are applied are referred to as "adherends."

In general, examples of the structure of a release sheet include a structure as a film formed of a resin having a releasability, or a structure in which a release layer is laminated on a substrate such as a film or a paper.

Resins having releasability are generally expensive, and hence a release sheet such as the above-described film-shaped release sheet formed of such a resin as a single substance is disadvantageously expensive.

Accordingly, there have been proposed a large number of products in each of which a release layer is laminated on an inexpensive substrate by extrusion laminating or by coating.

However, such an extrusion laminating suffers from difficulty in forming a thin layer on a substrate to result in low cost-reduction effect, and also offers a problem with respect to the adhesion to the substrate.

The lamination by coating is an effective processing method for forming a thin release layer and various methods for such lamination are proposed.

For example, as the methods using a solvent-based coating agent, there have been proposed a method in which a vinyl group-containing polydimethylsiloxane is laminated (JP 2002-182037 A) and a method in which a fluorine compound is laminated (JP 2007-002066 A).

On the other hand, examples of a method using an aqueous release coating agent include methods in which a material such as a wax, a low molecular weight silicone compound or a fluorinated surfactant is laminated as a release layer. However, there occurs a disadvantage that when an adherend is peeled off from the release sheet, these release agents are transferred to the adherend to degrade the functions of the adherend such as the pressure-sensitive adhesiveness of the adherend.

As a countermeasure against the disadvantage, there have been proposed methods in which a silicone resin is laminated by coating (JP 07-196984 A, JP 2005-125656 A), a method in which a fluorine-containing resin is laminated (JP 2004-114620 A), methods in which a polyolefin resin having a specific composition is laminated (JP 2007-031639 A, JP 2002-265719 A), and a method in which laminated is a resin layer composed of a release agent obtained by reacting polyvinyl alcohol with a long chain alkyl compound and an acid-modified polyolefin copolymer (JP 09-104851 A).

DISCLOSURE OF THE INVENTION

Problems to be Solved by the Invention

However, the resin layer described in JP 2002-182037 A requires a treatment at a high temperature for lamination and curing; and the resin described in JP 2007-002066 A is expensive and additionally hardly burns and generates toxic gases in the waste incineration treatment after use. Either of these resins disadvantageously requires the use of an organic solvent in a large amount for uniform coating of the release agent.

The resin layers described in JP 07-196984 A and JP 2005-125656 A, each using an aqueous coating agent, are poor in the adhesion to the substrate, and additionally the properties such as the releasability are insufficient. The method described in JP 2004-114620 A is left with the same problems as encountered in JP 2007-002066 A.

The methods of JP 2007-031639 A and JP 2002-265719 A have been proposed in order to solve these problems. However, in JP 2007-031639 A, no evaluation as an actual release sheet has been made, and additionally, there is a possibility of contaminating the adherend because the coating agent contains a surfactant. On the other hand, the resin used in JP 2002-265719 A is expensive and the production of a release sheet from this resin requires a treatment at a high temperature because this resin has a high melting point.

In the method of JP 09-104851 A, a step is required in which polyvinyl alcohol is preliminarily reacted with a long chain alkyl compound to prepare a release agent, and additionally, the addition of a surfactant is essential for the production of a coating agent from the release agent, and hence there is a possibility of contaminating the adherend.

In view of these problems, the present invention intends to provide a release sheet which is easy to produce, free from the transfer of the release layer to the adherend and small in the environmental load at the time of discarding the sheet.

Means for Solving the Problems

The present inventors made a diligent study in order to solve the above-described problems, and consequently have reached the present invention by discovering that the layer of a resin prepared by mixing a specific functional group-containing compound and/or polyvinyl alcohol with an acid-modified polyolefin resin is excellent in releasability and effective as a release sheet including the layer of the resin as laminated on a substrate.

Specifically, the subject matter of the present invention is as follows.

(1) A release sheet including a resin layer formed on a substrate, wherein the resin layer includes: 100 parts by mass of an acid-modified polyolefin resin including an acid-modifying component in a content of 1 to 10% by mass; and 1 to 50 parts by mass of a crosslinking agent and/or 5 to 1000 parts by mass of polyvinyl alcohol, the crosslinking agent being composed of a carbodiimide compound and/or an oxazoline compound.

(2) A method for producing a release sheet, wherein a liquid material is applied onto a substrate and then dried, the liquid material including: 100 parts by mass of an acid-modified polyolefin resin including an acid-modifying component in a content of 1 to 10% by mass; and 1 to 50 parts by mass of a crosslinking agent and/or 5 to 1000 parts by mass of polyvinyl alcohol, the crosslinking agent being composed of a carbodiimide compound and/or an oxazoline compound.

Advantages of the Invention

The release sheet of the present invention is provided with a satisfactory releasability as well as a wettability. Moreover, in the development of the releasability, the release sheet of the present invention does not need any release agent such as a wax, a low molecular weight silicone compound or a surfactant. Accordingly, the adherend is not contaminated at the time of peeling off the release sheet. Additionally, the use of a release agent containing a halogen element such as fluorine can be avoided and hence the environmental load at the time of discarding the release sheet is low.

The release sheet of the present invention can be preferably used as protective materials for pressure-sensitive adhesive materials, liquid crystal display components and the like; as processing materials for production of printed wiring boards; and in applications including the applications to form sheet-shaped structures such as ion exchange membranes and ceramic green sheets.

According to the method for producing a release sheet of the present invention, the release sheet of the present invention can be industrially obtained in an easy and simple manner.

BEST MODE FOR CARRYING OUT THE INVENTION

Hereinafter, the present invention is described in detail.

The release sheet of the present invention includes a substrate and a resin layer formed on the substrate. The resin layer includes an acid-modified polyolefin resin and a crosslinking agent and/or polyvinyl alcohol.

The acid-modified polyolefin resin included in the resin layer is required to contain the acid-modifying component thereof in a content of 1 to 10% by mass of the acid-modified polyolefin resin, the content being preferably 1 to 7% by mass, more preferably 2 to 5% by mass and particularly preferably 2 to 3% by mass. When the content of the acid-modifying component is less than 1% by mass, no sufficient adhesion to the substrate may be achieved and the adherend may be contaminated; further, the resin tends to be hardly converted into an aqueous dispersion. On the other hand, when the content exceeds 10% by mass, the releasability tends to be degraded.

Examples of the acid-modifying component include unsaturated carboxylic acid components. Examples of the unsaturated carboxylic acid component include: acrylic acid, methacrylic acid, maleic acid, maleic acid anhydride, itaconic acid, itaconic acid anhydride, fumaric acid and crotonic acid; and half esters and half amides of unsaturated dicarboxylic acids. From the viewpoint of the dispersion stability of the resin, preferable among these are acrylic acid, methacrylic acid, maleic acid and maleic acid anhydride, and particularly preferable are acrylic acid, methacrylic acid and maleic acid anhydride.

The olefin component of the acid-modified polyolefin resin as the main component of the resin is not particularly limited, but is preferably an alkene having 2 to 6 carbon atoms such as ethylene, propylene, isobutylene, 2-butene, 1-butene, 1-pentene or 1-hexene, and may be a mixture of these. Among these, more preferable are alkenes having 2 to 4 carbon atoms such as ethylene, propylene, isobutylene and 1-butene, furthermore preferable are ethylene and propylene, and most preferable is ethylene.

The acid-modified polyolefin resin preferably includes a (meth)acrylic acid ester component because the (meth)acrylic acid ester component improves the adhesion to the substrate. When a (meth)acrylic acid ester component is included, the content of the (meth)acrylic acid ester component is preferably 0.5 to 40% by mass; for the purpose of attaining a satisfactory adhesion to various thermoplastic resin film substrates, the content range of the (meth)acrylic acid ester component is more preferably 1 to 20% by mass and furthermore preferably 3 to 10% by mass. Examples of the (meth)acrylic acid ester component include the esterified compounds between an (meth)acrylic acid and an alcohol having 1 to 30 carbon atoms; from the viewpoint of easy availability, preferable among these are the esterified compounds between an (meth)acrylic acid and an alcohol having 1 to 20 carbon atoms. Specific examples of such a compound include methyl(meth)acrylate, ethyl(meth)acrylate, propyl(meth)acrylate, butyl(meth)acrylate, hexyl(meth)acrylate, octyl(meth)acrylate, decyl(meth)acrylate, lauryl(meth)acrylate, dodecyl(meth)acrylate and stearyl(meth)acrylate. The mixtures of these may also be used. From the viewpoint of the adhesion to the substrate film, more preferable among these are methyl(meth)acrylate, ethyl(meth)acrylate, butyl(meth)acrylate, hexyl acrylate and octyl acrylate; furthermore preferable are ethyl acrylate and butyl acrylate; and particularly preferable is ethyl acrylate. Here, it is to be noted that "(meth)acrylate" means "acrylate" or "methacrylate."

The individual components constituting the acid-modified polyolefin are only required to be copolymerized in the acid-modified polyolefin resin, and the form of the copolymerization is not particularly limited. Examples of the copolymerization type include random copolymerization, block copolymerization and graft copolymerization (graft modification).

The melting point of the acid-modified polyolefin resin is preferably 80 to 150° C., more preferably 85 to 130° C. and furthermore preferably 90 to 100° C. When the melting point is higher than 150° C., the formation of the resin layer requires a treatment at a high temperature, and when the melting point is lower than 80° C., the releasability is remarkably degraded.

The Vicat softening point of the acid-modified polyolefin resin is preferably 50 to 130° C., more preferably 53 to 110° C. and furthermore preferably 55 to 90° C. When the Vicat softening point is lower than 50° C., the releasability is degraded, and when the Vicat softening point is higher than 130° C., the formation of the resin layer requires a treatment at a high temperature.

The melt flow rate of the acid-modified polyolefin resin is preferably 1 to 1000 g/10 min, more preferably 1 to 500 g/10 min, furthermore preferably 2 to 300 g/10 min and particularly preferably 2 to 200 g/10 min, at 190° C. with a load of 2160 g. The acid-modified polyolefin resin having a melt flow rate of less than 1 g/10 min has difficulty in producing the resin and has difficulty in preparing an aqueous dispersion thereof. The acid-modified polyolefin resin having a melt flow rate exceeding 1000 g/10 min is degraded in the adhesion of the resin layer to the substrate and facilitates the shift of the resin layer to the adherend.

Examples of the acid-modified polyolefin resin usable in the present invention include, under the trade names, the Bondine series resins which are maleic acid anhydride-modified polyolefin resins manufactured by Arkema Inc. Specifically, examples of the concerned trade names include "LX-4110," "HX-8210," "HX-8290," and "AX-8390."

The resin layer of the release sheet of the present invention includes a crosslinking agent and/or polyvinyl alcohol. The crosslinking agent is a carbodiimide compound or an oxazoline compound.

Of the carbodiimide compound and the oxazoline compound, more preferable is the oxazoline compound from the viewpoint of the mixing stability and the storage stability.

The content of the crosslinking agent in relation to 100 parts by mass of the acid-modified polyolefin resin is required to be 1 to 50 parts by mass, and is more preferably 3 to 30 parts by mass and furthermore preferably 5 to 10 parts by mass.

When the content concerned is less than 1 part by mass, the addition effect is poor, and when the content concerned exceeds 50 parts by mass, the releasability may be degraded. A carbodiimide compound and an oxazoline compound can be used in combination; in such a case, the total amount of the carbodiimide compound and the oxazoline compound is only required to satisfy the above-described content range of the crosslinking agent.

The carbodiimide compound used in the present invention is not particularly limited as long as the carbodiimide compound includes in the molecule thereof at least two or more carbodiimide groups. Examples of such a carbodiimide include: carbodiimide group-containing compounds such as p-phenylene-bis(2,6-xylylcarbodiimide), tetramethylene-bis (t-butylcarbodiimide) and cyclohexane-1,4-bis(methylene-t-butylcarbodiimide); and polycarbodiimide that is a polymer having carbodiimide groups. One or two or more of these compounds can be used. Preferable among these is polycarbodiimide from the viewpoint of the easy handleability. The method for producing polycarbodiimide is not particularly limited. Polycarbodiimide can be produced, for example, by the condensation reaction of an isocyanate compound accompanied by elimination of carbon dioxide. The isocyanate compound is also not particularly limited, and may be any of an aliphatic isocyanate, an alicyclic isocyanate and an aromatic isocyanate. The isocyanate compound may be copolymerized, where necessary, with a multifunctional liquid rubber, polyalkylene diol or the like.

Examples of the commercially available polycarbodiimide include the Carbodilite series manufactured by Nisshinbo Chemical Inc. More specifically, examples of the Carbodilite series include in terms of the trade names: water-soluble-type polycarbodiimides such as "SV-02," "V-02," "V-02-L2" and "V-04"; emulsion-type polycarbodiimides such as "E-01" and "E-02"; organic-solution type polycarbodiimides such as "V-01," "V-03," "V-07" and "V-09"; and non-solvent-type polycarbodiimides such as "V-05."

The oxazoline compound in the present invention is not particularly limited as long as the oxazoline compound has two or more oxazoline groups in the molecule thereof. Examples of such an oxazoline compound include: oxazoline group-containing compounds such as 2,2'-bis(2-oxazoline), 2,2'-ethylene-bis(4,4'-dimethyl-2-oxazoline), 2,2'-p-phenylene-bis(2-oxazoline) and bis(2-oxazolinylcyclohexane) sulfide; and oxazoline group-containing polymers. One or two or more of these compounds can be used. Preferable among these are oxazoline group-containing polymers from the viewpoint of the easy handleability. The oxazoline group-containing polymers are obtained by polymerization of addition-polymerizable oxazolines such as 2-vinyl-2-oxazoline, 2-vinyl-4-methyl-2-oxazoline and 2-isopropenyl-2-oxazoline. The oxazoline group-containing polymers may be copolymerized where necessary with other monomers. The polymerization method of the oxazoline group-containing polymer is not particularly limited, and various known polymerization methods can be adopted.

Examples of the commercially available oxazoline group-containing polymers include the Epocros series manufactured by Nippon Shokubai Co., Ltd. More specifically, examples of the Epocros series include in terms of the trade names: water-soluble-type polymers such as "WS-500" and "WS-700"; and emulsion-type polymers such as "K-1010E," "K-1020E," "K-1030E," "K-2010E," "K-2020E," and "K-2030E."

The polyvinyl alcohol in the present invention is not particularly limited; however, examples of the polyvinyl alcohol include polyvinyl alcohols obtained by complete or partial saponification of vinyl ester polymers. As the saponification method, known alkali saponification methods and acid saponification methods can be used. Preferable among these is a method in which alcoholysis is performed in methanol by using alkali hydroxide. The polyvinyl alcohol in the present invention preferably has water solubility for the purpose of being used in a liquid material as described below.

Examples of the vinyl esters include vinyl formate, vinyl acetate, vinyl propionate, vinyl pivalate and vinyl versatate. Industrially most preferable among these is vinyl acetate.

Within a range in which the advantageous effects of the present invention are not impaired, it is possible to copolymerize other vinyl compounds with vinyl esters. Examples of the vinyl monomers as the other vinyl compounds include unsaturated monocarboxylic acids such as crotonic acid, acrylic acid and methacrylic acid, and the esters, salts, anhydrides, amides and nitriles of these acids; unsaturated dicarboxylic acids such as maleic acid, itaconic acid and fumaric acid, and the salts of these acids; α-olefins having 2 to 30 carbon atoms; alkyl vinyl ethers; and vinyl pyrrolidones.

The average degree of polymerization of polyvinyl alcohol is not particularly limited, but is preferably 300 to 2,000.

When polyvinyl alcohol is used, the content of polyvinyl alcohol in relation to 100 parts by mass of the acid-modified polyolefin resin is required to be 5 to 1000 parts by mass, and is preferably 10 to 600 parts by mass, more preferably 20 to 400 parts by mass and most preferably 30 to 200 parts by mass. When the content is less than 5 parts by mass, the addition effect is poor. In the case where the content exceeds 1000 parts by mass, the improvement of the addition effect is poor, and when used in a liquid material, the liquid stability may be degraded.

Examples of commercially available polyvinyl alcohol include, in terms of specific trade names: "JC-05," "VC-10," "ASC-05X" and "UMR-10HH" falling under the category of "J-Poval" manufactured by Japan Vam & Poval Co., Ltd.; "PVA-103" and "PVA-105" falling under the category of "Kuraray Poval" and "AQ4104" and "HR3010" falling under the category of "Exeval" manufactured by Kuraray Co., Ltd.; and "PC-1000" and "PC-2000" falling under the category of "Denka Poval" manufactured by Denki Kagaku Kogyo K.K.

The crosslinking agent and polyvinyl alcohol are used in combination without causing troubles; when used in combination, it is required that the addition amounts of the crosslinking agent and polyvinyl alcohol in relation to the acid-modified polyolefin resin respectively fall within a range that satisfies the above-described mass proportion in relation to the acid-modified polyolefin resin.

In the resin layer of the release sheet, the total content of a silicone compound, a fluorine compound, a wax and a surfactant is preferably 1 part by mass or less in relation to 100 parts by mass of the acid-modified polyolefin resin. With the decrease of this total content, the adhesion between the resin layer and the substrate is more improved, and the contamination of the adherend is more suppressed. Consequently, the total content is preferably 0.5 part by mass or less, more preferably 0.1 part by mass or less and particularly preferably zero part by mass.

A wax as referred to herein means a wax having a number average molecular weight of 10,000 or less, such as a vegetable wax, an animal wax, a mineral wax and a petrochemical wax. Specific examples of such a wax include: candelilla wax, carnauba wax, rice wax, sumac wax, berry wax, jojoba wax, shea butter, bees wax, shellac wax, lanolin wax, spermaceti wax, montan wax, ceresin, paraffin wax, microcrystalline wax, synthetic polyethylene wax, synthetic polypropylene wax and synthetic ethylene-vinyl acetate copolymer wax.

Examples of the above-described surfactant include: a cationic surfactant, an anionic surfactant, a nonionic surfactant, an amphoteric surfactant, a fluorinated surfactant and a reactive surfactant. Emulsifiers and the like as well as the surfactants generally used in emulsion polymerization are also included.

Examples of the anionic surfactant include sulfuric acid ester salts of higher alcohols, higher alkylsulfonic acids and the salts thereof, alkylbenzenesulfonic acids and the salts thereof, polyoxyethylene alkylsulfate salts, polyoxyethylene alkyl phenyl ether sulfate salts and vinyl sulfosuccinate. Examples of the nonionic surfactant include: polyoxyethylene structure-containing compounds such as polyoxyethylene alkyl ether, polyoxyethylene alkyl phenyl ether, polyethylene glycol fatty acid esters, ethylene oxide-propylene oxide block copolymer, polyoxyethylene fatty acid amides and ethylene oxide-propylene oxide copolymer; and sorbitan derivatives such as polyoxyethylene sorbitan fatty acid esters. Examples of the amphoteric surfactant include lauryl betaine and lauryl dimethylamine oxide. Examples of the reactive surfactant include reactive double bond-containing compounds such as: alkyl propenyl phenol polyethylene oxide adducts and the sulfuric acid ester salts of these adducts; allyl alkylphenol polyethylene oxide adducts and the sulfuric acid ester salts of these adducts; and allyl dialkylphenol polyethylene oxide adducts and the sulfuric acid ester salts of these adducts.

Examples of the substrate for the release sheet include the substrates formed of a resin material, paper, synthetic paper, cloth, a metal material or a glass material. The thickness of the substrate is not particularly limited; the thickness is usually only required to be 1 to 1000 μm, and is preferably 1 to 500 μm, more preferably 1 to 100 μm and particularly preferably 1 to 50 μm.

Examples of thermoplastic resins as the resin materials usable for the substrate include: polyester resins such as polyethylene terephthalate (PET), polyethylene naphthalate (PEN) and polylactic acid (PLA); polyolefin resins such as polypropylene; polystyrene resins; polyamide resins such as 6-nylon, poly-m-xylylene adipamide (nylon MXD6); polycarbonate resins; polyacrylonitrile resins; polyimide resins; and multilayer laminates of these resins (for example, nylon 6/MXD/nylon 6, nylon 6/ethylene-vinyl alcohol copolymer/nylon 6) and mixtures of these resins. The resin materials may have been subjected to stretching treatment. The resin materials may include known additives and stabilizers such as an antistatic agent, a plasticizer, a lubricant and an antioxidant. For the purpose of improving the adhesion in laminating with other materials, the resin materials may be those materials the surface of which have been subjected to pretreatments such as corona treatment, plasma treatment, ozone treatment, chemical treatment and solvent treatment. The surface of the resin materials may also be vapor deposited with silica, alumina or the like, and alternatively, may also be laminated with other layers such as a barrier layer, an easy-adhesion layer, an antistatic layer, an ultraviolet absorbing layer and an adhesive layer.

In particular, because resin materials are highly easily electrified and sometimes cause various troubles, when a resin material is used as a substrate, the resin material is preferably subjected to an antistatic treatment. With a substrate having been subjected to an antistatic treatment, the release sheet being used as a processing film can prevent the product defects due to the adsorption of debris, dirt and dust in the atmosphere caused by the static charge created through the frictional electrification or the peeling electrification occurring in the peeling step. On the other hand, with a substrate having been subjected to an antistatic treatment, the release sheet being used as a protective material for a pressure-sensitive adhesive can prevent the pressure-sensitive adhesibility degradation due to the attachment of dirt and dust onto the pressure-sensitive adhesive surface caused by the static charge created through the peeling electrification.

A release sheet including a substrate formed of a resin material having been subjected to an antistatic treatment preferably has a surface intrinsic resistance of $10^{10}\Omega/\square$ or less. When the surface intrinsic resistance is larger than $10^{10}\Omega/\square$, the antistatic property is not sufficient, and hence static electrification tends to occur. Consequently, dirt and dust in the atmosphere adhere to lead to a possibility that defects are caused in the products or the pressure-sensitive adhesibility of the pressure-sensitive adhesive is degraded.

Examples of a method for obtaining a resin material having been subjected to an antistatic treatment include a method in which an antistatic material is kneaded in a resin and a method in which an antistatic material-containing layer is laminated on a resin material. The method in which an antistatic material-containing layer is laminated enables the antistatic treatment to be performed at a lower cost.

Examples of the antistatic material usable for the antistatic treatment include: conductive polymers such as polyaniline-based polymers, polypyrrole-based polymers and thiophene-based polymers; conductive carbons such as carbon black and Ketchen black; and tin oxide-based ultrafine particles such as ultrafine particles of tin oxide, antimony-doped tin oxide and tin oxide-doped indium. The antistatic treatment can be performed by kneading these antistatic materials, each as a single substance or as a composition mixed with a binder resin, in the resin material to constitute the substrate, or by applying these antistatic materials as liquid materials onto the surface of the resin material. In particular, the use of the tin oxide-based ultrafine particles is preferable because such ultrafine particles are excellent in transparency and hence facilitate the detection of foreign matters in the inspection step.

The method for producing the tin oxide-based ultrafine particle is not particularly limited. For example, any of the following methods can be used: a method in which metal tin or a tin compound is hydrolyzed or thermally hydrolyzed, a method in which a tin ion-containing acidic solution is subjected to an alkaline hydrolysis; and a method in which a tin ion-containing solution is subjected to ion exchange with an ion exchange membrane or with an ion exchange resin.

The above-described method for producing an antistatic material is not particularly limited, and commercially available antistatic materials can be used; examples of the commercially available antistatic materials include: a polypyrrole dispersion solution PPY-12 manufactured by Marubishi Oil Chemical Co., Ltd.; a conductive carbon dispersion solution WS310A manufactured by Lion Corp.; tin oxide ultrafine particle aqueous dispersions, EPS-6 manufactured by Yamanaka Chemical Industry, Inc., and AS11T and AS20I manufactured by Unitika Ltd.; an antimony-doped tin oxide-based ultrafine particle aqueous dispersion SN-100D manufactured by Ishihara Sangyo Kaisha, Ltd.; and a tin oxide-doped indium ultrafine particle ITO manufactured by C.I. Kasei Co., Ltd.

Examples of the binder to be mixed with the antistatic material include: polyester resin, polyolefin resin, polyamide resin, polyvinyl alcohol resin, polyvinyl acetate, urethane resin, polyvinyl chloride resin, polyvinylidene chloride resin, ethylene-(meth)acrylic acid copolymer, styrene-maleic acid resin, styrene-butadiene resin, butadiene resin, poly(meth) acrylonitrile resin, (meth)acrylamide resin, chlorinated polyethylene resin and chlorinated polypropylene resin. These resins can be appropriately selected according to the substrate to be used. Two or more of these resins may be used as a mixture.

The thickness of the antistatic layer is preferably 0.01 to 100 μm, more preferably 0.05 to 20 μm and furthermore preferably 0.1 to 5 μm in the sense that these specified thickness provide a uniform-thickness coating having a sufficient antistatic property and a sufficient strength, and being hardly scratched.

The antistatic treatment is not limited to resin materials, but may also be applied to below-described paper, synthetic paper, cloth, glass materials and the like.

Examples of the paper usable as the substrate include Japanese paper, craft paper, liner paper, art paper, coat paper, carton paper, glassine paper and semi-glassine paper.

The synthetic paper usable as the substrate is not particularly limited in the structure thereof. The structure of the synthetic paper may be of a single layer structure or of a multilayer structure. Examples of the multilayer structure may include a two-layer structure having a base layer and a surface layer, a three-layer structure having surface layers on both of the front and back sides of the base layer and a multilayer structure having another resin film layer between the base layer and one of the surface layers. Each of these layers may include an inorganic or organic filler, or alternatively may include no filler. Microporous synthetic paper having a large number of fine voids can also be used.

Examples of the cloth usable as the substrate include nonwoven fabric, woven fabric and knitted fabric made of fibers of the above-described synthetic resins, and made of natural fibers such as cotton, silk and hemp.

Examples of the metal material usable as the substrate include metal foils such as aluminum foil and copper foil, and metal plates such as an aluminum plate and a copper plate.

Examples of the glass material usable as the substrate include a glass plate and a cloth made of glass fiber.

In each of the substrates using the above-described resin materials, further any of paper, synthetic paper, cloth, other resin materials, metal materials and the like may be laminated on the side of the substrate opposite to the side on which a resin layer is provided.

The thickness of the resin layer in the release sheet preferably falls within a range from 0.01 to 5 μm, more preferably from 0.1 to 2 μm, furthermore preferably 0.2 to 1 μm and particularly preferably 0.3 to 0.7 μm. When the thickness is less than 0.01 μm, no sufficient releasability is obtained, and when the thickness exceeds 5 μm, the releasability may be degraded. In particular, in the case where a resin layer is formed on a resin material having been subjected to an antistatic treatment, when the thickness of the resin layer exceeds 5 μm, no sufficient antistatic property is obtained, electrification occurs in the peeling step, and dirt and dust in the atmosphere adhere onto the surface of the adherend, and hence there may be offered the causes for the defects and the pressure-sensitive adhesibility degradation in the product.

The wetting tension of the surface of the resin layer is preferably 30 mN/m or more and more preferably 32 mN/m or more. When the wetting tension is less than 30 mN/m, it may be difficult to laminate another coating agent or a liquid material on the resin layer. The wetting tension means the critical surface tension according to Zisman. This tension can be measured according to the method described in JIS K6768.

By using the release sheet of the present invention, the peel strength between the resin layer and the pressure-sensitive adhesive material as the adherend, after the thermocompression bonding of the resin layer of the release sheet and the pressure-sensitive adhesive material as the adherend to each other, can be made to be 10 N/50-mm width or less, preferably 8 N/50-mm width or less and more preferably 7 N/50-mm width or less. When the peel strength exceeds 10 N/50-mm width, it is difficult to use a sheet having such a peel strength as a release sheet.

The release sheet of the present invention can be obtained industrially in an easy and simple manner by a production method in which the liquid material including the acid-modified polyolefin resin and the crosslinking agent and/or polyvinyl alcohol is applied onto a substrate and then dried.

The method for producing the liquid material including the acid-modified polyolefin resin and the crosslinking agent and/or polyvinyl alcohol is not particularly limited as long as the method is capable of uniformly mixing the individual components in a liquid medium. Examples of such a method include the following methods.

(i) A method in which to a dispersion solution or a solution of the acid-modified polyolefin resin, a dispersion solution or a solution of the crosslinking agent or polyvinyl alcohol is added and mixed.

(ii) A mixture composed of the acid-modified polyolefin resin and polyvinyl alcohol is liquefied.

In the case of the above-described method (i), it is only required to appropriately mix together the dispersion solutions or the solutions. When the dispersion solution or the solution of polyvinyl alcohol is used, the solute concentration of the dispersion or the solution is not particularly limited. However, from the viewpoint of easiness in handling, the solute concentration is preferably 5 to 10% by mass. In the case of the above-described method (ii), when the acid-modified polyolefin resin is liquefied, polyvinyl alcohol resin may be added.

Alternatively, when other components are added, such components can be added at the optional stages of the production method (i) or (ii).

The solvent in the liquid material including the acid-modified polyolefin resin and the crosslinking agent and/or polyvinyl alcohol is not particularly limited as long as the liquid material can be applied onto the substrate. Specifically, examples of such a solvent include water, an organic solvent or an aqueous medium including water and an amphiphilic organic solvent. Among these, water or an aqueous medium is preferably used from the environmental concerns. When the liquid material includes polyvinyl alcohol, water or an aqueous medium is preferably used as the medium from the viewpoint of the solubility of polyvinyl alcohol.

Examples of the organic solvent include: ketones such as diethyl ketone (3-pentanone), methyl propyl ketone (2-pentanone), methyl isobutyl ketone (4-methyl-2-pentanone), 2-hexanone, 5-methyl-2-hexanone, 2-heptanone, 3-heptanone, 4-heptanone, cyclopentanone and cyclohexanone; aromatic hydrocarbons such as toluene, xylene, benzene, solvesso 100 and solvesso 150; aliphatic hydrocarbons such as butane, pentane, hexane, cyclohexane, heptane, octane and nonane; halogen-containing compounds such as methylene chloride, chloroform, carbon tetrachloride, 1,2-dichloroethane, 1,1,2,2-tetrachloroethane, chlorobenzene, o-dichlorobenzene, m-dichlorobenzene and p-dichlorobenzene; esters such as ethyl acetate, isopropyl acetate, n-butyl acetate, isobutyl acetate, sec-butyl acetate, 3-methoxybutyl acetate, methyl propionate, ethyl propionate, diethyl carbonate, γ-butyrolactone and isophorone; and below-described amphiphilic organic solvents.

In the present invention, the aqueous medium means a solvent in which water and an amphiphilic organic solvent are included and the content of water is 2% by mass or more. The amphiphilic organic solvent means an organic solvent for which the solubility of water at 20° C. is 5% by mass or more. (The solubilities of water at 20° C. in organic solvents are described in the documents such as "Handbook of Solvents," 10th Ed., Kodansha Scientific, 1990). Specific examples of the amphiphilic organic solvent include: alcohols such as methanol, ethanol (hereinafter abbreviated as "EA"), n-propanol (hereinafter abbreviated as "NPA") and isopropanol (hereinafter abbreviated as "IPA"); ethers such as tetrahydrofuran and 1,4-dioxane; ketones such as acetone and methyl ethyl ketone; esters such as methyl acetate, n-propyl acetate, isopropyl acetate, methyl propionate, ethyl propionate and dimethyl carbonate; organic amine compounds inclusive of ammonia such as diethylamine, triethylamine (hereinafter abbreviated as "TEA"), diethanolamine, triethanolamine, N,N-dimethylethanolamine (hereinafter abbreviated as "DMEA"), N,N-diethylethanolamine and N-diethanolamine; and lactams such as 2-pyrrolidone and N-methyl-2-pyrrolidone.

The method for dispersing the acid-modified polyolefin resin in such an aqueous medium as described above is not particularly limited; examples of such a method include a method described in International Publication No. WO 02/055598.

From the viewpoint of the stability at the time of mixing with other components and the storage stability after mixing, the dispersed particle size of the acid-modified polyolefin resin in an aqueous medium is, in terms of the number-average particle size, preferably 1 μm or less and more preferably 0.8 μm or less. Such a particle size can be attained by the production method described in WO 02/055598.

The solid content proportion in the liquid material used in the present invention can be appropriately selected according to the lamination conditions, the targeted thickness, the targeted performances and the like, and is not particularly limited. However, for the purpose of properly maintaining the viscosity of the liquid material and forming a satisfactory resin layer, the solid content proportion is preferably 1 to 60% by mass and more preferably 5 to 30% by mass.

Examples of the method for coating the substrate with the liquid material may include known methods such as gravure roll coating, reverse roll coating, wire bar coating, lip coating, air knife coating, curtain flow coating, spray coating, dip coating and brush coating. With these methods, the liquid material is uniformly applied to the surface of the substrate, and where necessary, subjected to setting around room temperature, then subjected to a drying treatment or a heat treatment for drying, and thus a uniform resin layer can be formed on the substrate in a manner adhering to the substrate.

The release sheet of the present invention has a satisfactory releasability to various adherends, and accordingly, can be applied for forming a laminate by laminating the release sheet on an adherend through the intermediary of the resin layer. Specifically, the release sheet of the present invention can be suitably used as protective materials for pressure-sensitive adhesive materials, liquid crystal display components and the like, processing materials for pressing printed wiring boards, processing materials for forming sheet-shaped structures and the like.

Examples of the pressure-sensitive adhesive material include pressure-sensitive adhesive sheets, adhesive sheets, pressure-sensitive adhesive tapes and adhesive tapes. More specifically, examples of the pressure-sensitive adhesive material include articles prepared by laminating pressure-sensitive adhesives on a substrate. The components of the pressure-sensitive adhesive and the substrate are not particularly limited. Examples of the pressure-sensitive adhesive include at least one selected from an acrylic pressure-sensitive adhesive, a natural rubber pressure-sensitive adhesive and a synthetic rubber pressure-sensitive adhesive. The pressure-sensitive adhesive may include a tackifier such as a rosin tackifier, a coumarone-indene tackifier, a terpene tackifier, a petroleum tackifier, a styrene tackifier, a phenolic tackifier or a xylene tackifier. Examples of the substrate include the above-described paper, cloth and resin materials.

Examples of the liquid crystal display components include polarizing plates, retardation-polarizing plates and retardation plates.

Examples of the printed wiring boards include single-side printed wiring boards, double-side printed wiring boards, flexible printed wiring boards and multilayer printed wiring boards.

Examples of the sheet-shaped structures include: ion exchange membranes formed of polyelectrolytes such as perfluorosulfonic acid resins; and ceramic green sheets formed of dielectric ceramics, glass or the like. These structures are formed by casting on the release sheet a raw material as a paste or a slurry prepared with a solvent.

EXAMPLES

Hereinafter, the present invention is described specifically with reference to Examples. However, the present invention is not limited by these Examples.
(1) Constitution of Acid-Modified Polyolefin Resin
The constitution was determined with a $^1$H-NMR analyzer (GEMINI 2000/300, 300 MHz, manufactured by Varian, Inc.). Ortho-dichlorobenzene ($d_4$) was used as a solvent and measurement was performed at 120° C.
(2) Melting Point of Acid-Modified Polyolefin Resin
A measurement of the melting point was performed with 10 mg of the resin as a sample, by using a DSC (differential scanning calorimeter) apparatus (DSC7 manufactured by Perkin-Elmer Corp.) under a condition of a temperature rising rate of 10° C./min and the melting point was determined from the obtained temperature rising curve.
(3) Vicat Softening Point of Acid-Modified Polyolefin Resin
The Vicat softening point was measured according to the method described in JIS K7206.
(4) Melt Flow Rate (MFR) of Acid-Modified Polyolefin Resin
The melt flow rate was measured according to the method described in JIS K6730 (190° C., 2160 g load).
(5) Content of Organic Solvent in Aqueous Dispersion
A gas chromatograph GC-8A manufactured by Shimadzu Corp. [FID detector was used; carrier gas: nitrogen; column packing substance (manufactured by GL Sciences Inc.): PEG-HT (5%)-Uniport HP (60/80 mesh); column size: 3 mm in diameter×3 m; sample placement temperature (injection temperature): 150° C.; column temperature: 60° C.; internal standard substance: n-butanol] was used. The content of the organic solvent was measured by directly placing, in the gas chromatograph, an aqueous dispersion or a sample prepared by diluting the aqueous dispersion with water. The detection limit was 0.01% by mass.
(6) Solid Content Concentration of Liquid Material
An appropriate amount of the liquid material was weighed out, and heated at 150° C. until the mass of the residual substance (solid content) reached a constant value, and thus the solid content concentration was determined.

(7) Number Average Particle Size of Acid-Modified Polyolefin Resin Particles

By using a Microtrac particle size distribution analyzer UPA 150 (Model No. 9340, dynamic light scattering method) manufactured by Nikkiso Co., Ltd., the number average particle size was determined. The refractive index of the resin used for the derivation of the particle size was 1.57.

(8) Thickness of Resin Layer

The liquid material was applied to the substrate film and dried, and then the total thickness of the film laminated with the resin layer (hereinafter referred to as "release film") was measured with a contact film thickness meter; from the measured value, the thickness of the substrate film was subtracted to give the thickness of the resin layer.

(9) Wetting Tension of Resin Layer Surface

According to the measurement method described in JIS K6768, standard solutions (ethylene glycol monoethyl ether/ formamide) which were prepared so as to monotonically vary in surface tension from one standard solution to another standard solution were applied to the treated surface, and the surface tension of a particular standard solution which was determined to wet the resin layer surface was adopted to indicate the wetting tension.

(10) Peel Strength

Onto the resin layer of the obtained release film, a polyester pressure-sensitive adhesive tape (No. 31B/acrylic pressure-sensitive adhesive, manufactured by Nitto Denko Corp.) of 50 mm in width and 150 mm in length was compression bonded with a rubber roll to prepare a sample. The sample was interposed in a form of metal plate/rubber plate/sample/rubber plate/metal plate, and was allowed to stand for 20 hours under a load of 2 kPa in an atmosphere set at 70° C., then cooled for 30 minutes or more down to room temperature, and thus a sample for peel strength measurement was obtained. The peel strength between the pressure-sensitive adhesive tape and the release film in the sample for peel strength measurement was measured in a thermostatic room set at 25° C. with a tensile tester (a precise universal material testing machine, model 2020, manufactured by Intesco Co., Ltd.). The peel angle was set at 180° and the peel speed was set at 300 mm/min.

(11) Pressure-Sensitive Re-Adhesiveness

The polyester pressure-sensitive adhesive tape of 50 mm in width peeled off from the release film surface in the above-described peel strength test was bonded to the corona-treated surface of a biaxially stretched polyester resin film ("Emblet PET-12," thickness: 12 μm, manufactured by Unitika Ltd.), and allowed to stand at room temperature for 20 hours under a load of 2 kPa. Then, the peel strength (re-adhesion strength) between the polyester pressure-sensitive adhesive tape and the film was measured in a thermostatic room set at 25° C. with the tensile tester (a precise universal material testing machine, model 2020, manufactured by Intesco Co., Ltd.). The peel angle was set at 180° and the peel speed was set at 300 mm/min.

When the pressure-sensitive adhesive surface of the pressure-sensitive adhesive tape is contaminated with the release film, the pressure-sensitive re-adhesiveness of the pressure-sensitive adhesive tape is degraded and the performance as a pressure-sensitive adhesive tape is impaired. Therefore, the higher pressure-sensitive re-adhesiveness is the more preferable.

(12) Antistatic Property of Release Film

On the basis of JIS-K6911, by using a digital ultrahigh resistance/microammeter R8340 manufactured by Advantest Corp., the surface intrinsic resistance of the resin layer was measured in an atmosphere set at a temperature of 23° C. and at a humidity of 65%.

[Aqueous Dispersion E-1]

By using a stirrer equipped with a hermetically sealable, pressure-proof 1-liter volume glass vessel with a heater attached thereto, 60.0 g of "Bondine LX-4110" (maleic acid anhydride-modified polyolefin resin, manufactured by Arkema Inc.), 90.0 g of IPA (manufactured by Wako Pure Chemical Industries, Ltd.), 3.0 g of TEA (manufactured by Wako Pure Chemical Industries, Ltd.) and 147.0 g of distilled water were placed in the glass vessel. The resulting mixture was stirred for 30 minutes by setting the rotation speed of the stirrer blades at 300 rpm and maintaining the temperature in the reaction system at 140 to 145° C. Then the reaction mixture was immersed in a water bath and cooled down to room temperature (approximately 25° C.) while being stirred at a rotation speed still set at 300 rpm. Then, the reaction mixture was filtered under pressure (air pressure: 0.2 MPa) with a 300-mesh stainless steel filter (wire diameter: 0.035 mm, plain weave). Thus, a milk-white uniform acid-modified polyolefin resin aqueous dispersion E-1 was obtained.

[Aqueous Dispersion E-2]

As the acid-modified polyolefin resin, "Bondine HX-8210" (maleic acid anhydride-modified polyolefin resin, manufactured by Arkema Inc.) was used, and the same operations as performed in the production of the aqueous dispersion E-1 were performed to yield an acid-modified polyolefin resin aqueous dispersion E-2.

[Aqueous Dispersion E-3]

As the acid-modified polyolefin resin, "Bondine HX-8290" (maleic acid anhydride-modified polyolefin resin, manufactured by Arkema Inc.) was used, and the same operations as performed in the production of the aqueous dispersion E-1 were performed to yield an acid-modified polyolefin resin aqueous dispersion E-3.

[Aqueous Dispersion E-4]

By using a stirrer equipped with a hermetically sealable, pressure-proof 1-liter volume glass vessel with a heater attached thereto, 60.0 g of "Bondine AX-8390" (maleic acid anhydride-modified polyolefin resin, manufactured by Arkema Inc.), 100.0 g of NPA (manufactured by Wako Pure Chemical Industries, Ltd.), 2.5 g of TEA (manufactured by Wako Pure Chemical Industries, Ltd.) and 137.5 g of distilled water were placed in the glass vessel. The resulting mixture was stirred for 20 minutes by setting the rotation speed of the stirrer blades at 300 rpm and maintaining the temperature in the reaction system at 120° C. Then the reaction mixture was air-cooled down to room temperature (approximately 25° C.) while being stirred at a rotation speed still set at 300 rpm. Then, the reaction mixture was filtered under pressure (air pressure: 0.2 MPa) with a 300-mesh stainless steel filter (wire diameter: 0.035 mm, plain weave). Thus, a milk-white uniform acid-modified polyolefin resin aqueous dispersion E-4 was obtained.

[Aqueous Dispersion E-5]

By using a stirrer equipped with a hermetically sealable, pressure-proof 1-liter volume glass vessel with a heater attached thereto, 60.0 g of "Primacor 5980I" (acrylic acid-modified polyolefin resin, manufactured by Dow Chemical Inc.), 16.8 g of TEA and 223.2 g of distilled water were placed in the glass vessel. The resulting mixture was stirred for 30 minutes by setting the rotation speed of the stirrer blades at 300 rpm and maintaining the temperature in the reaction system at 140 to 145° C. Then the reaction mixture was immersed in a water bath and cooled down to room temperature (approximately 25° C.) while being stirred at a rotation speed still set at 300 rpm. Then, the reaction mixture was filtered under pressure (air pressure: 0.2 MPa) with a 300-mesh stainless steel filter (wire diameter: 0.035 mm, plain weave). Thus, a slightly clouded aqueous dispersion E-5 was obtained. In this case, almost no resin remained on the filter.

[Aqueous Dispersion E-6]

By using a stirrer equipped with a hermetically sealable, pressure-proof 1-liter volume glass vessel with a heater attached thereto, 60.0 g of "Bondine HX-8210," 208.3 g of EA, 3.3 g of DMEA and 28.4 g of distilled water were placed in the glass vessel. The resulting mixture was stirred for 40 minutes by setting the rotation speed of the stirrer blades at 300 rpm and maintaining the temperature in the reaction system at 120° C. Then the reaction mixture was air-cooled down to room temperature (approximately 25° C.) while being stirred at a rotation speed still set at 300 rpm. Then, the reaction mixture was filtered under pressure (air pressure: 0.2 MPa) with a 300-mesh stainless steel filter (wire diameter: 0.035 mm, plain weave). Thus, a milk-white aqueous dispersion E-6 was obtained. In this case, almost no resin remained on the filter.

[Solution E-7]

By using a stirrer equipped with a hermetically sealable, pressure-proof 1-liter volume glass vessel with a heater attached thereto, 15.0 g of "Bondine HX-8210" and 285.0 g of toluene were placed in the glass vessel. The resulting mixture was stirred for 40 minutes by setting the rotation speed of the stirrer blades at 300 rpm and maintaining the temperature in the reaction system at 120° C. Then the reaction mixture was air-cooled down to approximately 50° C. while being stirred at a rotation speed still set at 300 rpm. Then, the reaction mixture was filtered under pressure (air pressure: 0.2 MPa) with a 300-mesh stainless steel filter (wire diameter: 0.035 mm, plain weave). Thus, a solution E-7 was obtained. In this case, almost no resin remained on the filter.

The compositions of the acid-modified polyolefin resins used in the production of the liquid materials E-1 to E-7 are shown in Table 1. The compositions of the obtained liquid materials are shown in Table 2. The content of the organic solvent in the solution E-7 was derived by subtracting the solid content concentration.

TABLE 1

|  |  | Composition of acid-modified polyolefin resin (% by mass) | | | | Melt flow rate (g/10 min) | Melting point (° C.) | Vicat softening point (° C.) |
| --- | --- | --- | --- | --- | --- | --- | --- | --- |
|  |  | Ethylene | Ethyl acrylate | Acrylic acid | Maleic acid anhydride | | | |
| Polyolefin resin | Bondine LX-4110 | 91 | 7 | 0 | 2 | 5 | 107 | 81 |
|  | Bondine HX-8210 | 91 | 6 | 0 | 3 | 200 | 100 | 57 |
|  | Bondine HX-8290 | 80 | 18 | 0 | 2 | 65 | 81 | 43 |
|  | Bondine AX-8390 | 68 | 30 | 0 | 2 | 7 | 67 | 38 |
|  | Primacor 5980I | 80 | 0 | 20 | 0 | 300 | 79 | 42 |

TABLE 2

| | | Type of acid-modified polyolefin resin liquid material | | | | | | |
| --- | --- | --- | --- | --- | --- | --- | --- | --- |
| | | E-1 | E-2 | E-3 | E-4 | E-5 | E-6 | E-7 |
| Resin | | Bondine LX-4110 | Bondine HX-8210 | Bondine HX-8290 | Bondine AX-8390 | Primacor 5980I | Bondine HX-8210 | Bondine HX-8210 |
| Solid content concentration (% by mass) | | 20 | 20 | 20 | 20 | 20 | 20 | 5 |
| Liquid media | Organic solvent species | IPA + TEA | IPA + TEA | IPA + TEA | NPA + TEA | TEA | EA + DMEA | Toluene |
| | Organic solvent (% by mass) | 31 | 31 | 31 | 34 | 6 | 70 | 95 |
| | Water (% by mass) | 49 | 49 | 49 | 46 | 74 | 10 | 0 |
| Number average particle size of resin (μm) | | 0.08 | 0.06 | 0.08 | 0.09 | 0.02 | 0.10 | — |

As shown in Table 1, the acid-modified polyolefin resin "Bondine LX-4110" used in the liquid material E-1 and the acid-modified polyolefin resin "Bondine LX-8210" used in the liquid material E-2, E-6 and E-7, the acid-modified polyolefin resin "Bondine HX-8290" used in the liquid material E-3 and the acid-modified polyolefin resin "Bondine AX-8390" used in the liquid material E-4 all included the acid-modifying component in a range of 1 to 10% by mass, and were in conformity with the present invention. On the contrary, the acid-modified polyolefin resin "Primacor 5980I" used in the liquid material E-5 included the acid-modifying component in a content exceeding 10% by mass, and thus was not in conformity with the present invention.

[Aqueous Dispersion E-8]

Isopropyl alcohol was added to a tin oxide ultrafine particle dispersion (AS11T, solid content concentration: 11.5% by mass, manufactured by Unitika Ltd.) in such a way that the proportion of isopropyl alcohol in the obtained aqueous dispersion is 20% by mass, and stirred to yield a transparent aqueous dispersion. To this aqueous dispersion, a polyester resin aqueous dispersion (Eritel KZA-3556, solid content concentration: 30% by mass, manufactured by Unitika Ltd.) was added in such a way that the content of the tin oxide ultrafine particle is 800 parts by mass in relation to 100 parts by mass of the polyester resin solid content, and stirred. Thus an aqueous dispersion E-8 which included polyester resin and the tin oxide ultrafine particle was obtained. The solid content concentration of the aqueous dispersion E-8 was 10.0% by mass.

[Aqueous Dispersion E-9]

In place of the tin oxide ultrafine particle dispersion AS11T in the aqueous dispersion E-8, an antimony-doped tin oxide ultrafine particle aqueous dispersion (SN-100D, solid content concentration: 30.0% by mass, manufactured by Ishihara Sangyo Kaisha, Ltd.) was used. Otherwise by performing the same operations as in the production of the aqueous dispersion E-8, an aqueous dispersion E-9 was obtained.

[Aqueous Dispersion E-10]

In place of the tin oxide ultrafine particle dispersion AS11T in the aqueous dispersion E-8, a polypyrrole dispersion solution (PPY-12, solid content concentration: 8.0% by mass, manufactured by Marubishi Oil Chemical Co., Ltd.) was used. Otherwise by performing the same operations as in the production of the aqueous dispersion E-8, an aqueous dispersion E-10 was obtained.

[Aqueous Dispersion E-11]

In place of the tin oxide ultrafine particle dispersion AS11T in the aqueous dispersion E-8, a conductive carbon dispersion solution (WS310A, solid content concentration: 17.5% by mass, manufactured by Lion Corp.) was used. Otherwise by performing the same operations as in the production of the aqueous dispersion E-8, an aqueous dispersion E-11 was obtained.

[Polyester Resin Film F-1 Having Antistatic Layer Formed Thereon]

The aqueous dispersion E-8 was applied to the corona-treated surface of a biaxially stretched polyester resin film ("Emblet PET-12," thickness: 12 μm, manufactured by Unitika Ltd.) by using a Mayer bar, and then dried at 120° C. for 30 seconds. Thus, a polyester resin film F-1 having a 0.3-μm thick antistatic layer formed thereon was obtained.

[Polyester Resin Film F-2 Having Antistatic Layer Formed Thereon]

In place of the aqueous dispersion E-8 in the film F-1, the aqueous dispersion E-9 was used. Otherwise by performing the same operations as in the production of the film F-1, a polyester resin film F-2 having a 0.3-μm thick antistatic layer formed thereon was obtained.

[Polyester Resin Film F-3 Having Antistatic Layer Formed Thereon]

In place of the aqueous dispersion E-8 in the film F-1, the aqueous dispersion E-10 was used. Otherwise by performing the same operations as in the production of the film F-1, a polyester resin film F-3 having a 0.3-μm thick antistatic layer formed thereon was obtained.

[Polyester Resin Film F-4 Having Antistatic Layer Formed Thereon]

In place of the aqueous dispersion E-8 in the film F-1, the aqueous dispersion E-11 was used. Otherwise by performing the same operations as in the production of the film F-1, a polyester resin film F-4 having a 0.3-μm thick antistatic layer formed thereon was obtained.

The details of the polyester resin films F-1 to F-4 are shown in Table 3.

TABLE 3

| | Films having an antistatic layer formed thereon | | | |
|---|---|---|---|---|
| | F-1 | F-2 | F-3 | F-4 |
| Resin film | Biaxially stretched polyester resin film PET-12 | Biaxially stretched polyester resin film PET-12 | Biaxially stretched polyester resin film PET-12 | Biaxially stretched polyester resin film PET-12 |
| Coating liquid | E-8 | E-9 | E-10 | E-11 |
| Antistatic material | Tin oxide AS11T | Antimony-doped tin oxide SN-100D | Polypyrrole PPY-12 | Conductive carbon WS310A |

Example 1

The acid-modified polyolefin resin aqueous dispersion E-1 and an oxazoline compound aqueous solution ("Epocross WS-500," solid content concentration: 40% by mass, manufactured by Nippon Shokubai Co., Ltd.) were mixed together in such a way that the solid content amount of the oxazoline compound was 5 parts by mass in relation to 100 parts by mass of the acid-modified polyolefin resin solid content, and thus a liquid material was obtained. The liquid material was applied to the corona-treated surface of a biaxially stretched polyester resin film ("Emblet PET-12," thickness: 12 μm, manufactured by Unitika Ltd.) by using a Mayer bar, and then dried at 150° C. for 90 seconds. Thus a release film having a 0.6-μm thick resin layer formed thereon was obtained.

Examples 2 to 4

In place of the acid-modified polyolefin resin aqueous dispersion E-1 in Example 1, E-2 to E-4 were used. Otherwise by performing the same operations as in Example 1, release films were obtained.

Example 5

In place of E-1 in Example 1, E-3 was used. Additionally, the used amount of the oxazoline compound aqueous solution "WS-500" was altered in such a way that the solid content amount of the oxazoline compound aqueous solution was 30 parts by mass in relation to 100 parts by mass of the solid content of E-3. Otherwise in the same manner as in Example 1, a liquid material was obtained. By using the liquid material, the same operations as in Example 1 were performed, and thus a release film was obtained.

Example 6

In place of the oxazoline compound aqueous solution in Example 1, a carbodiimide compound aqueous dispersion was used. Specifically, the acid-modified polyolefin resin aqueous dispersion E-1 and a carbodiimide compound aqueous dispersion ("Carbodilite E-02," solid content concentration: 40% by mass, manufactured by Nisshinbo Chemical Inc.) were mixed together in such a way that the solid content amount of the carbodiimide compound was 5 parts by mass in relation to 100 parts by mass of the acid-modified polyolefin resin solid content, and thus a liquid material was obtained. The liquid material was applied to the corona-treated surface of a biaxially stretched polyester resin film by using a Mayer bar, and then dried at 150° C. for 90 seconds. Thus a release film having a 0.6-μm thick resin layer formed thereon was obtained.

Example 7

The addition amount of the carbodiimide compound aqueous dispersion "E-02" in Example 6 was set in such a way that the solid content amount of the carbodiimide compound aqueous dispersion "E-02" was 30 parts by mass in relation to 100 parts by mass of the solid content of E-1. Otherwise by performing the same operations as in Example 6, a release film was obtained.

Example 8

In place of the aqueous dispersion E-1 in Example 6, E-2 was used. Additionally, the mixing amount of the carbodiimide compound aqueous dispersion was set in such a way that the solid content amount of the carbodiimide compound aqueous dispersion was 50 parts by mass in relation to 100 parts by mass of the solid content of E-2. Otherwise by performing the same operations as in Example 6, a release film was obtained.

Example 9

In place of the aqueous dispersion E-1 in Example 1, the dispersion E-6 was used. Otherwise by performing the same operations as in Example 1, a release film was obtained.

Example 10

To the solution E-7 maintained at 50° C., a toluene solution of a carbodiimide compound ("Carbodilite V-07," solid content concentration: 50% by mass, manufactured by Nisshinbo Chemical Inc.) was added in such a way that the carbodiimide compound solid content was 5 parts by mass in relation to 100 parts by mass of the acid-modified polyolefin resin solid content. The resulting solution was mixed while the solution temperature was being maintained and thus a liquid material was obtained. The obtained liquid material was rapidly applied to the corona-treated surface of the same biaxially stretched polyester resin film as in Example 1 by using a Mayer bar, and then dried at 150° C. for 90 seconds. Thus a release film having a 0.3-μm resin layer formed thereon was obtained.

Example 11

To the acid-modified polyolefin resin aqueous dispersion E-1, 30 parts by mass of polyvinyl alcohol ("VC-10," degree of polymerization: 1,000, manufactured by Nippon Vam & Poval Co., Ltd.) was added as a 10% by mass aqueous solution in relation to 100 parts by mass of the resin solid content of the aqueous dispersion E-1, and thus a liquid material was obtained. The liquid material was applied to the corona-treated surface of the same biaxially stretched polyester resin film as in Example 1 by using a Mayer bar, and then dried at 150° C. for 90 seconds. Thus a release film having a 0.6-μm resin layer formed thereon was obtained.

It is to be noted that hereinafter, polyvinyl alcohol is abbreviated as "PVA."

Examples 12 to 16

A 10% by mass aqueous solution of PVA "VC-10" was added in such a way that the addition amount of the PVA "VC-10" in Example 11, in relation to 100 parts by mass of the resin solid content of E-1, was 10 parts by mass (Example 12), 100 parts by mass (Example 13), 300 parts by mass (Example 14), 600 parts by mass (Example 15) and 1000 parts by mass (Example 16). Otherwise by performing the same operations as in Example 11, respective release films were obtained.

Example 17

In place of the acid-modified polyolefin resin aqueous dispersion E-1 in Example 11, E-2 was used. Otherwise by performing the same operations as in Example 11, a release film was obtained.

Example 18

In place of PVA "VC-10" in Example 11, an ethylene-modified PVA ("Exeval HR3010," degree of polymerization: 1,000, manufactured by Kuraray Co., Ltd.) was used. Otherwise by performing the same operations as in Example 11, a release film was obtained.

Example 19

In addition to the PVA "VC-10" in Example 11, 5 parts by mass, in terms of solid content, of an oxazoline compound aqueous solution "WS-500" manufactured by Nippon Shokubai Co., Ltd. was further added in relation to 100 parts by mass of the resin solid content of the acid-modified polyolefin resin aqueous dispersion E-1. Otherwise by performing the same operations as in Example 11, a release film was obtained.

Example 20

In addition to the PVA "VC-10" in Example 11, 5 parts by mass, in terms of solid content, of a carbodiimide compound aqueous dispersion "E-02" manufactured by Nisshinbo Chemical Inc. was further added in relation to 100 parts by mass of the resin solid content of the acid-modified polyolefin resin aqueous dispersion E-1. Otherwise by performing the same operations as in Example 11, a release film was obtained.

Examples 21 to 24

In place of the biaxially stretched polyester resin film "PET-12" in Example 1, the polyester resin films F-1, F-2, F-3 and F-4 each having an antistatic layer formed thereon were used. Otherwise by performing the same operations as in Example 1, release films were obtained.

Examples 25 to 28

In place of the biaxially stretched polyester resin film "PET-12" in Example 19, the polyester resin films F-1, F-2, F-3 and F-4 each having an antistatic layer formed thereon were used. Otherwise by performing the same operations as in Example 19, release films were obtained.

The evaluation results for the respective release films obtained in Examples 1 to 28 are shown in Tables 4 to 6.

TABLE 4

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Substrate | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 |
| Liquid material | E-1 | E-2 | E-3 | E-4 | E-3 | E-1 | E-1 | E-2 | E-6 | E-7 |
| Resin type | Polyolefin | Polyolefin | Polyolefin | Polyolefin | Polyolefin | Polyolefin | Polyolefin | Polyolefin | Polyolefin | Polyolefin |
| Additive | Oxazoline compound WS-500 | Oxazoline compound WS-500 | Oxazoline compound WS-500 | Oxazoline compound WS-500 | Oxazoline compound WS-500 | Carbodiimide compound E-02 | Carbodiimide compound E-02 | Carbodiimide compound E-02 | Oxazoline compound WS-500 | Carbodiimide compound V-07 |
| Resin/additive (mass ratio) | 100/5 | 100/5 | 100/5 | 100/5 | 100/30 | 100/5 | 100/30 | 100/50 | 100/5 | 100/5 |
| Wetting tension (mN/m) | 32 | 32 | 32 | 32 | 32 | 32 | 32 | 32 | 32 | 32 |
| Peel strength (N/50-mm width) | 6.2 | 4.3 | 8.3 | 7.0 | 9.4 | 6.9 | 8.8 | 9.8 | 4.4 | 4.7 |
| Pressure-sensitive re-adhesiveness (N/50-mm width) | 13.2 | 13.9 | 13.5 | 13.3 | 13.3 | 14.0 | 13.9 | 13.9 | 13.8 | 13.9 |
| Surface intrinsic resistance ($\Omega/\square$) | $10^{14}$ | $10^{14}$ | $10^{14}$ | $10^{14}$ | $10^{14}$ | $10^{14}$ | $10^{14}$ | $10^{14}$ | $10^{14}$ | $10^{14}$ |

TABLE 5

| | Example 11 | Example 12 | Example 13 | Example 14 | Example 15 | Example 16 | Example 17 | Example 18 | Example 19 | Example 20 |
|---|---|---|---|---|---|---|---|---|---|---|
| Substrate | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 |
| Liquid material | E-1 | E-1 | E-1 | E-1 | E-1 | E-1 | E-2 | E-1 | E-1 | E-2 |
| Resin type | Polyolefin | Polyolefin | Polyolefin | Polyolefin | Polyolefin | Polyolefin | Polyolefin | Polyolefin | Polyolefin | Polyolefin |
| Additive(s) | PVA VC-10 | PVA VC-10 | PVA VC-10 | PVA VC-10 | PVA VC-10 | PVA VC-10 | PVA VC-10 | PVA HR-3010 | PVA/Oxazoline compound VC-10/WS-500 | PVA/Carbodiimide compound VC-10/E-02 |
| Resin/additive(s) (mass ratio) | 100/30 | 100/10 | 100/100 | 100/300 | 100/600 | 100/1000 | 100/30 | 100/30 | 100/30/5 | 100/30/5 |
| Wetting tension (mN/m) | 32 | 32 | 32 | 32 | 32 | 32 | 32 | 32 | 32 | 32 |
| Peel strength (N/50-mm width) | 6.4 | 7.1 | 5.5 | 8.1 | 7.7 | 9.6 | 6.0 | 6.6 | 6.1 | 6.0 |
| Pressure-sensitive re-adhesiveness (N/50-mm width) | 13.8 | 13.7 | 13.8 | 13.6 | 13.7 | 13.6 | 13.8 | 13.2 | 13.7 | 13.6 |
| Surface intrinsic resistance ($\Omega/\square$) | $10^{14}$ | $10^{14}$ | $10^{14}$ | $10^{14}$ | $10^{14}$ | $10^{14}$ | $10^{14}$ | $10^{14}$ | $10^{14}$ | $10^{14}$ |

TABLE 6

|  | Example 21 | Example 22 | Example 23 | Example 24 | Example 25 | Example 26 | Example 27 | Example 28 |
|---|---|---|---|---|---|---|---|---|
| Substrate | F-1 | F-2 | F-3 | F-4 | F-1 | F-2 | F-3 | F-4 |
| Liquid material | E-1 | E-1 | E-1 | E-1 | E-1 | E-1 | E-1 | E-1 |
| Resin type | Polyolefin | Polyolefin | Polyolefin | Polyolefin | Polyolefin | Polyolefin | Polyolefin | Polyolefin |
| Additive(s) | Oxazoline compound WS-500 | Oxazoline compound WS-500 | Oxazoline compound WS-500 | Oxazoline compound WS-500 | PVA/ Oxazoline compound VC-10/ WS-500 | PVA/ Oxazoline compound VC-10/ WS-500 | PVA/ Oxazoline compound VC-10/ WS-500 | PVA/ Oxazoline compound VC-10/ WS-500 |
| Resin/additive(s) (mass ratio) | 100/5 | 100/5 | 100/5 | 100/5 | 100/30/5 | 100/30/5 | 100/30/5 | 100/30/5 |
| Wetting tension (mN/m) | 32 | 32 | 32 | 32 | 32 | 32 | 32 | 32 |
| Peel strength (N/50-mm width) | 6.3 | 6.2 | 6.6 | 6.2 | 6.1 | 6.2 | 6.4 | 6.1 |
| Pressure-sensitive re-adhesiveness (N/50-mm width) | 13.5 | 13.6 | 13.4 | 13.2 | 13.7 | 13.8 | 13.9 | 13.7 |
| Surface intrinsic resistance ($\Omega/\square$) | $10^{10}$ | $10^{6}$ | $10^{8}$ | $10^{5}$ | $10^{9}$ | $10^{6}$ | $10^{8}$ | $10^{5}$ |

Comparative Example 1

No resin layer was formed on a biaxially stretched polyester resin film ("Emblet PET-12," thickness: 12 μm, manufactured by Unitika Ltd.). The corona-treated surface of the film was subjected to the evaluation of the peel strength and the pressure-sensitive re-adhesiveness.

Comparative Example 2

As compared to Example 3, the solid content amount of the oxazoline compound was set at 60 parts by mass in relation to 100 parts by mass of the acid-modified polyolefin. Otherwise by performing the same operations as in Example 3, a release film was obtained.

Comparative Example 3

As compared to Example 6, the solid content amount of the carbodiimide compound was set at 60 parts by mass in relation to 100 parts by mass of the acid-modified polyolefin. Otherwise by performing the same operations as in Example 6, a release film was obtained.

Comparative Example 4

As compared to Example 11, the 10% by mass aqueous solution of PVA "VC-10" was added in such a way that the addition amount of PVA was 1100 parts by mass in relation to 100 parts by mass of the acid-modified polyolefin. Otherwise by performing the same operations as in Example 11, a release film was obtained.

Comparative Example 5

As the liquid material, only the acid-modified polyolefin-containing aqueous dispersion E-3 was used. In other words, used was a liquid material that included the acid-modified polyolefin but included neither a crosslinking agent nor polyvinyl alcohol. Otherwise by performing the same operations as in Example 1, a release film was obtained.

Comparative Example 6

As the liquid material, only the 10% by mass aqueous solution of PVA "VC-10" was used. In other words, used was a liquid material that included polyvinyl alcohol but included neither the acid-modified polyolefin nor a crosslinking agent. Otherwise by performing the same operations as in Example 1, a release film was obtained.

Comparative Example 7

In place of the acid-modified polyolefin resin aqueous dispersion E-1 in Example 1, a polyurethane resin aqueous dispersion (Adeka Bontighter HUX380, solid content concentration: 38% by mass, manufactured by Adeka Corp.) was used. Otherwise by performing the same operations as in Example 1, a release film was obtained.

Comparative Example 8

In place of the acid-modified polyolefin resin aqueous dispersion E-1 in Example 1, a polyester resin aqueous dispersion (Eritel KZA-3556, solid content concentration: 30% by mass, manufactured by Unitika Ltd.) was used. Otherwise by performing the same operations as in Example 1, a release film was obtained.

Comparative Examples 9 and 10

In place of the aqueous dispersion E-1 in Example 1, the acid-modified polyolefin resin aqueous dispersion E-5 including 20% by mass of an acid-modifying component was used; and an oxazoline compound aqueous solution "WS-500" manufactured by Nippon Shokubai Co., Ltd. (Comparative Example 9) or a carbodiimide compound aqueous dispersion "E-02" manufactured by Nisshinbo Chemical Inc. (Comparative Example 10) was added in such a way that the solid content of "WS-500" or "E-02" was 10 parts by mass in relation to 100 parts by mass of the solid content of E-5. Otherwise by performing the same operations as in Example 1, release films were obtained.

Comparative Example 11

In place of the aqueous dispersion E-1 in Example 11, the acid-modified polyolefin resin aqueous dispersion E-5 including 20% by mass of an acid-modifying component was used. Otherwise by performing the same operations as in Example 11, a release film was obtained.

Comparative Examples 12 and 13

In place of the oxazoline compound in Example 3, a 10% by mass aqueous solution of an isocyanate compound ("Basonat HW-100," solid content concentration: 100% by mass, manufactured by BASF Corp.) (Comparative Example 12) or an epoxy compound aqueous dispersion ("Adeka Resin EM-051R," solid content concentration 50% by mass, manufactured by Adeka Corp.) (Comparative Example 13) was added in such a way that the solid content of "HW-100" or "EM-051R" was 5 parts by mass in relation to 100 parts by mass of the solid content of E-3. The obtained liquid materials were applied to films in the same manner as in Example 3, and thus respective release films were obtained.

Comparative Example 14

In place of PVA "VC-10" in Example 11, a 10% by mass aqueous solution of polyethylene glycol ("Polyethylene Glycol #20,000," molecular weight: 15,000 to 25,000, manufactured by Nacalai Tesque, Inc.) was added in such a way that the solid content amount of the polyethylene glycol was 30 parts by mass in relation to 100 parts by mass of the solid content of E-1. With the obtained liquid material, a film was coated in the same manner as in Example 11, and thus a release film was obtained.

Comparative Example 15

A fluorine-coated film "FT" manufactured by Unitika Ltd. was used, and no resin layer was formed on the film. Evaluations were performed on this film.

The evaluation results for Comparative Examples 1 to 15 are shown in Tables 7 to 8.

TABLE 7

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Substrate | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 |
| Liquid material | — | E-3 | E-1 | E-1 | E-3 | — | HUX380 | KZA-3556 |
| Resin type | — | Polyolefin | Polyolefin | Polyolefin | Polyolefin | — | Polyurethane | Polyester |
| Additive | — | Oxazoline compound WS-500 | Carbodiimide compound E-02 | PVA VC-10 | — | PVA VC-10 | Oxazoline compound WS-500 | Oxazoline compound WS-500 |
| Resin/additive (mass ratio) | — | 100/60 | 100/60 | 100/1100 | 100/0 | 0/100 | 100/5 | 100/5 |
| Wetting tension (mN/m) | 52 | 32 | 32 | 32 | 32 | 54 | 44 | 52 |
| Peel strength (N/50-mm width) | 39.3 | 14.5 | 12.3 | 11.6 | 27.3 | 23.7 | 35.2 | Material breakage |
| Pressure-sensitive re-adhesiveness (N/50-mm width) | 13.6 | 13.7 | 13.4 | 13.3 | 13.4 | 14.0 | 13.5 | Not measurable |
| Surface intrinsic resistance (Ω/□) | $10^{14}$ | $10^{14}$ | $10^{14}$ | $10^{14}$ | $10^{14}$ | $10^{14}$ | $10^{14}$ | $10^{14}$ |

TABLE 8

|  | Comparative Example 9 | Comparative Example 10 | Comparative Example 11 | Comparative Example 12 | Comparative Example 13 | Comparative Example 14 | Comparative Example 15 |
|---|---|---|---|---|---|---|---|
| Substrate | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Biaxially stretched polyester resin film PET-12 | Fluorine-coated film F-12 |
| Liquid material | E-5 | E-5 | E-5 | E-3 | E-3 | E-1 | — |
| Resin type | Polyolefin | Polyolefin | Polyolefin | Polyolefin | Polyolefin | Polyolefin | Fluororesin |
| Additive | Oxazoline compound WS-500 | Carbodiimide compound E-02 | PVA VC-10 | Isocyanate compound HW-100 | Epoxy compound EM-051R | Polyethylene glycol #20,000 | — |
| Resin/additive (mass ratio) | 100/10 | 100/10 | 100/30 | 100/5 | 100/5 | 100/30 | — |
| Wetting tension (mN/m) | 32 | 32 | 32 | 32 | 32 | 34 | Less than 23 |
| Peel strength | 15.0 | 18.8 | 20.6 | 22.5 | 24.1 | Not | 1.1 |

TABLE 8-continued

|  | Comparative Example 9 | Comparative Example 10 | Comparative Example 11 | Comparative Example 12 | Comparative Example 13 | Comparative Example 14 | Comparative Example 15 |
|---|---|---|---|---|---|---|---|
| (N/50-mm width) |  |  |  |  |  | measurable |  |
| Pressure-sensitive re-adhesiveness (N/50-mm width) | 13.7 | 13.0 | 12.9 | 13.3 | 13.5 | Not measurable | 13.6 |
| Surface intrinsic resistance (Ω/□) | $10^{14}$ | $10^{14}$ | $10^{14}$ | $10^{14}$ | $10^{14}$ | $10^{14}$ | $10^{14}$ |

As in Examples 1 to 26, the release films exhibited satisfactory wettability and satisfactory releasability, wherein the release films were each formed by laminating the resin including the acid-modified polyolefin resin which included an acid-modifying component in a content of 1 to 10% by mass, and a crosslinking agent and/or polyvinyl alcohol. In other words, in each of the release films, the wetting tension was 32 mN/m or more and the peel strength was 10 N/50-mm width or less. Additionally, as a result of the evaluation of the pressure-sensitive re-adhesiveness, no contamination of the pressure-sensitive adhesive surface due to the resin layer was able to be verified. These advantageous effects were verified to be free from the effect of the type of the medium at the time of coating (Examples 9 and 10). Further, by forming a resin layer on the substrate having been subjected to an antistatic treatment, the release films having a satisfactory antistatic property and a satisfactory releasability were obtained (Examples 21 to 28).

On the contrary, when the lamination of the resin layer was not performed, no releasability was developed (Comparative Example 1). When the composition ratios falling outside the range specified in the present invention were adopted, no releasability was developed (Comparative Examples 2 to 6).

When the resins other than the modified polyolefins specified in the present invention were used, no releasability was developed (Comparative Examples 7 to 11). In Comparative Example 8, the pressure-sensitive adhesive tape was broken in the measurement of the peel strength, and hence no peel strength was able to be measured, and hence the subsequent measurement of the pressure-sensitive re-adhesiveness was not able to be performed.

When the additives other than the additives specified in the present invention were used, no releasability was developed (Comparative Examples 12 to 14). In Comparative Example 14, when the specimen was being set to a peel strength measurement apparatus, the specimen underwent delamination in the interface between the resin layer and the PET film as the substrate, and hence no peel strength measurement was able to be performed. In other words, the adhesion between the substrate and the resin layer was insufficient. Additionally, the coating film was bonded to the pressure-sensitive adhesive tape, and hence no pressure-sensitive re-adhesiveness was also able to be measured.

The fluorine-coated film used in Comparative Example 15 was excellent in releasability and pressure-sensitive re-adhesiveness, but poor in wetting tension.

The invention claimed is:

1. A release sheet comprising a resin layer formed on a substrate, wherein the resin layer comprises:
   100 parts by mass of an acid-modified polyolefin resin including an unsaturated carboxylic acid component as an acid-modifying component in a content of 1 to 10% by mass; and
   1 to 50 parts by mass of a crosslinking agent composed of a carbodiimide compound and/or an oxazoline compound.

2. The release sheet according to claim 1, wherein the resin layer includes a silicone compound, a fluorine compound, a wax and a surfactant in a total content of from zero to 1 part by mass in relation to 100 parts by mass of the acid-modified polyolefin resin.

3. The release sheet according to claim 1, wherein a peel strength between the resin layer and a pressure-sensitive adhesive is 10 N/50-mm width or less, the peel strength being measured by bonding to the resin layer a pressure-sensitive adhesive material including as used therein an acrylic pressure-sensitive adhesive.

4. The release sheet according to claim 1, wherein the substrate is any of a resin material, a paper, a synthetic paper, a cloth, a metal material and a glass material.

5. The release sheet according to claim 1, wherein the release sheet is used for a pressure-sensitive adhesive material.

6. The release sheet according to claim 5, wherein the pressure-sensitive adhesive material is one of a sheet and a tape being each laminated with at least one type of pressure-sensitive adhesive selected from an acrylic pressure-sensitive adhesive, a natural rubber pressure-sensitive adhesive and a synthetic rubber pressure-sensitive adhesive.

7. The release sheet according to claim 1, wherein the release sheet is used for any of a printed wiring board, a polarizing plate and a retardation plate.

8. The release sheet according to claim 1, wherein the release sheet is used for forming a sheet-shaped structure.

9. The release sheet according to claim 1, wherein the substrate is a resin material subjected to an antistatic treatment.

10. The release sheet according to claim 9, wherein the surface electric resistance is $10^{10}$ Ω/□ or less, and a peel strength between the resin layer and a pressure-sensitive adhesive is 10 N/50-mm width or less, the peel strength being measured by bonding to the resin layer a pressure-sensitive adhesive material including as used therein an acrylic pressure-sensitive adhesive.

11. A method for producing a release sheet, wherein a liquid material is applied onto a substrate and then dried, the liquid material comprising:
   100 parts by mass of an acid-modified polyolefin resin including an unsaturated carboxylic acid component as an acid-modifying component in a content of 1 to 10% by mass; and 1 to 50 parts by mass of a crosslinking agent composed of a carbodiimide compound and/or an oxazoline compound.

12. The method for producing a release sheet according to claim 11, wherein the liquid material comprising an aqueous medium as a liquid medium contained therein is used.

13. The release sheet according to claim 1, wherein the resin layer includes 5 to 1000 parts by mass of polyvinyl alcohol.

14. The release sheet according to claim 13, wherein the resin layer includes a silicone compound, a fluorine compound, a wax and a surfactant in a total content of from zero to 1 part by mass in relation to 100 parts by mass of the acid-modified polyolefin resin.

15. The release sheet according to claim 13, wherein a peel strength between the resin layer and a pressure-sensitive adhesive is 10 N/50-mm width or less, the peel strength being measured by bonding to the resin layer a pressure-sensitive adhesive material including as used therein an acrylic pressure-sensitive adhesive.

16. The release sheet according to claim 13, wherein the substrate is any of a resin material, a paper, a synthetic paper, a cloth, a metal material and a glass material.

17. The release sheet according to claim 13, wherein the release sheet is used for a pressure-sensitive adhesive material.

18. The release sheet according to claim 17, wherein the pressure-sensitive adhesive material is one of a sheet and a tape being each laminated with at least one type of pressure-sensitive adhesive selected from an acrylic pressure-sensitive adhesive, a natural rubber pressure-sensitive adhesive and a synthetic rubber pressure-sensitive adhesive.

19. The release sheet according to claim 13, wherein the release sheet is used for any of a printed wiring board, a polarizing plate and a retardation plate.

20. The release sheet according to claim 13, wherein the release sheet is used for forming a sheet-shaped structure.

21. The release sheet according to claim 13, wherein the substrate is a resin material subjected to an antistatic treatment.

22. The release sheet according to claim 21, wherein the surface electric resistance is $10^{10} \Omega/\square$ or less, and a peel strength between the resin layer and a pressure-sensitive adhesive is 10 N/50-mm width or less, the peel strength being measured by bonding to the resin layer a pressure-sensitive adhesive material including as used therein an acrylic pressure-sensitive adhesive.

23. The method for producing a release sheet according to claim 11, wherein the liquid material includes 5 to 1000 parts by mass of polyvinyl alcohol.

24. The method for producing a release sheet according to claim 23, wherein the liquid material comprising an aqueous medium as a liquid medium contained therein is used.

* * * * *